United States Patent
Abdul et al.

(10) Patent No.: US 8,140,871 B2
(45) Date of Patent: Mar. 20, 2012

(54) WAKE ON LAN FOR BLADE SERVER

(75) Inventors: Anis M. Abdul, Austin, TX (US); Nikhil Hegde, Round Rock, TX (US); Ajay Kumar Mahajan, Austin, TX (US); Rashmi Narasimhan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 12/412,402

(22) Filed: Mar. 27, 2009

(65) Prior Publication Data

US 2010/0250914 A1    Sep. 30, 2010

(51) Int. Cl.
*G06F 1/26* (2006.01)
(52) U.S. Cl. ........................................ 713/310
(58) Field of Classification Search ............ 713/300, 713/310
See application file for complete search history.

(56) References Cited

U.S. PATENT DOCUMENTS

| | | |
|---|---|---|
| 6,795,450 B1 | 9/2004 | Mills et al. |
| 7,047,428 B2 | 5/2006 | Bui |
| 7,925,795 B2 * | 4/2011 | Tamir et al. ............. 709/250 |
| 2004/0268111 A1 | 12/2004 | Dayan et al. |
| 2005/0160162 A1 | 7/2005 | Cromer et al. |
| 2009/0133040 A1 * | 5/2009 | Stevens, IV ............. 719/315 |

* cited by examiner

*Primary Examiner* — Glenn A Auve
(74) *Attorney, Agent, or Firm* — Yee & Associates, P.C.; David A. Mims, Jr.

(57) ABSTRACT

A computer implemented method, a tangible computer medium, and a data processing system are provided for waking a blade server from an operational state of reduced power. When server blade enters the state of reduced power, a service firmware configures a multi-port blade switch of the server blade to direct incoming packets to the service firmware. The service firmware then polls for receipt of a Wake-on-Lan magic packet. When the Wake-on-Lan magic packet is received by the service firmware, the service firmware reconfigures the multi-port blade switch to direct incoming packets to a network interface card of the server blade. The service firmware then initiates a reboot of the server blade.

20 Claims, 5 Drawing Sheets

WAKE ON LAN FOR BLADE SERVER

BACKGROUND OF THE INVENTION

1. Field of the Invention

The present invention relates generally to a computer implemented method, a computer program product, and a data processing system. More specifically, the present invention relates to a computer implemented method, a computer program product, and a data processing system for intelligently Wake-on-Lan instructions to the various ports of an embedded multi-port switch.

2. Description of the Related Art

The use of server computers as devices within communications networks is well known in the art. A server is hardware that makes available file, database, printing, facsimile, communications or other services to client terminals/stations with access to the network the server serves. When the server permits client/terminal station access to an external communications network, it is sometimes known as a gateway. Servers are available in different sizes, shapes and varieties. Servers may be distributed throughout a network or they may be concentrated in centralized data centers.

Advances in centralized data processing centers have resulted in smaller form factors for server devices and an increase in the density of processing units, thereby reducing space requirements for computing infrastructure. One common form factor has been termed in the art a "blade server," comprising a device built for vertically inserting into a chassis that can house multiple devices that share power and other connections over a common backplane, i.e., a blade center. Slim, hot swappable blade servers, also referred to herein as "blades," fit in a single chassis like books on a bookshelf. Each blade server is an independent server, with its own processors, memory, storage, network controllers, operating system and applications. The blade server slides into a bay in the chassis and plugs into a mid- or backplane, sharing power, fans, floppy drives, switches, and ports with other blade servers. The benefits of the blade approach will be readily apparent to anyone tasked with running down hundreds of cables strung through racks just to add and remove servers. With switches and power units shared, precious space is freed up—and blade servers enable higher density with far greater ease. With a large number of high-performance server blades in a single chassis, blade technology achieves high levels of density.

A blade based rack uses a common bus for all the blades. This bus is used by the blades to communicate with the management module and also gives access to the external network via special external switch modules. Advanced versions of the server blades include an embedded blade switch. These embedded blade switches provide external connectivity to other units in the server blade, such as a Flexible Service Processor, available from International Business Machines, Corp.

BRIEF SUMMARY OF THE INVENTION

According to one embodiment of the present invention, a computer implemented method, a tangible computer medium, and a data processing system are provided for waking a blade server from an operational state of reduced power. When server blade enters the state of reduced power, a service firmware configures a multi-port blade switch of the server blade to direct incoming packets to the service firmware. The service firmware then polls for receipt of a Wake-on-Lan magic packet. When the Wake-on-Lan magic packet is received by the service firmware, the service firmware reconfigures the multi-port blade switch to direct incoming packets to a network interface card of the server blade. The service firmware then initiates a reboot of the server blade.

DETAILED DESCRIPTION OF THE INVENTION

Figure 1:
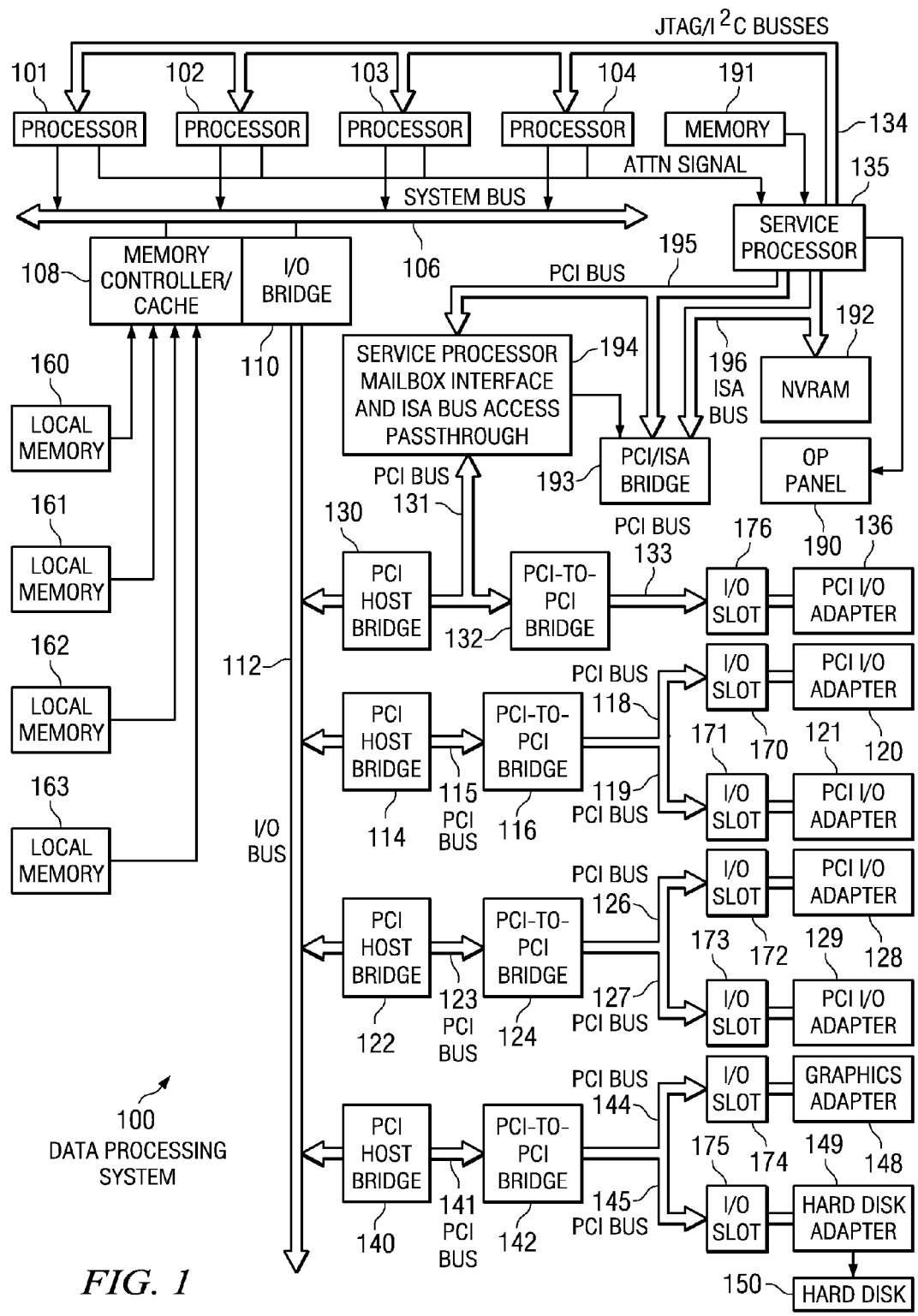
FIG. 1 is a block diagram of a data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I²C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
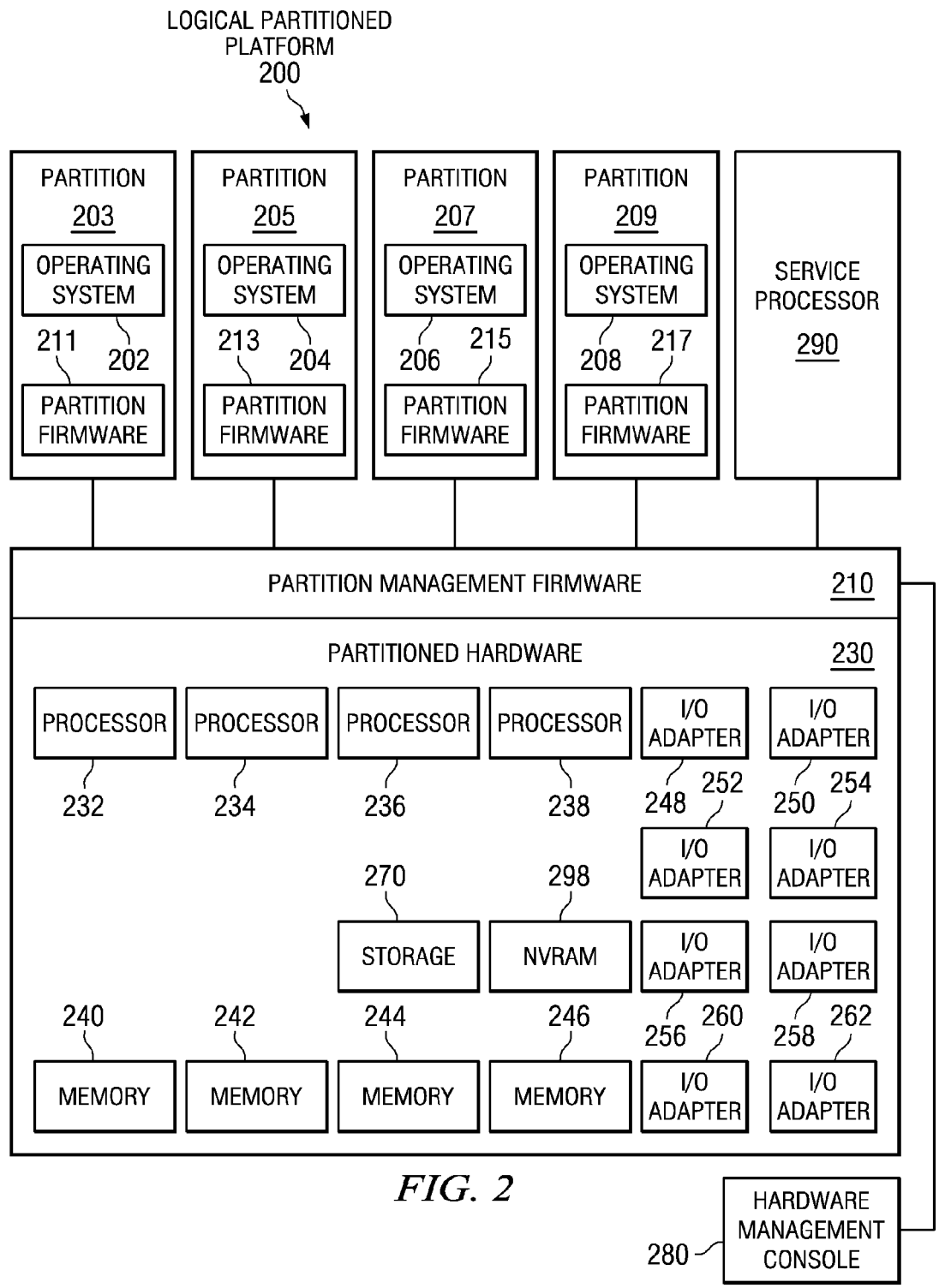
FIG. 2 is a block diagram of an exemplary logical partitioned in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202,

204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Figure 3:
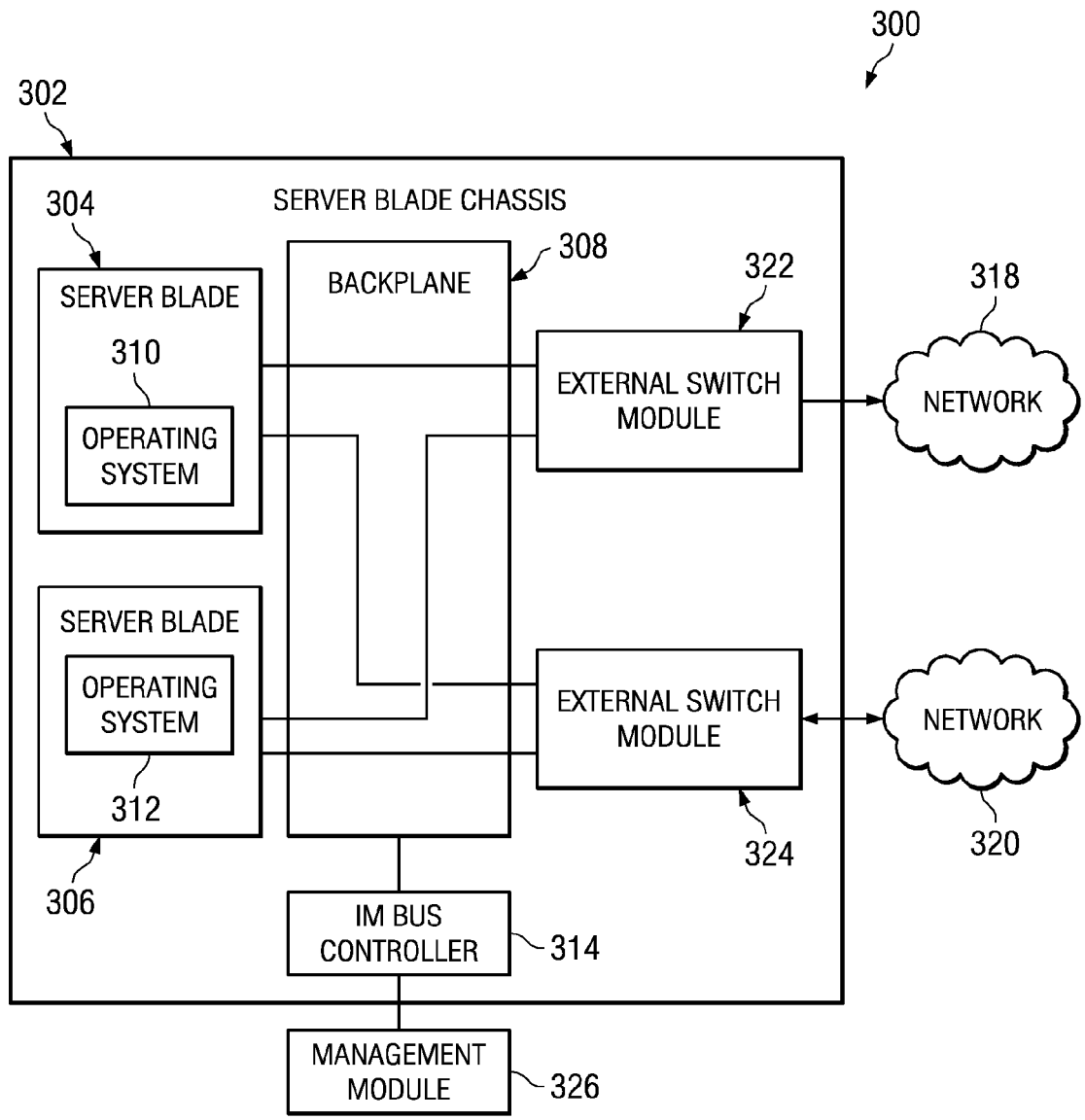
FIG. 3 is a typical server blade architecture according to the prior art.

Referring now to FIG. 3, a typical server blade architecture is shown according to the prior art. Blade server chassis architecture 300 contains several server blades 304 and 306 which can be servers 104 or 106 of FIG. 1.

Server blade chassis 302 includes multiple hot-swappable server blades 304 and 306, which are connected to backplane 308. Server blades 304 and 306 include operating systems 310 and 312 which communicate through backplane 308 via an intermediate bus controller 314. Operating systems 310 and 312 may be implemented with any of a variety of commercially distributed general purpose microprocessors including PowerPC® processors available from IBM Corporation.

Server blades 304 and 306 can connect to outside networks 318 and 320 through external switch modules 322 and 324. External switch modules 322 and 324 are hot-swappable switches that connect all blade servers in server blade chassis 302 to one of outside networks 318 or 320, depending on the bay in which external switch modules 322 or 324 is installed in.

Server blade chassis 302 includes management module 326. Management module 326 is a hot-swappable hardware device plugged into server blade chassis 302. Management module 326 functions as a system-management service processor and keyboard, video, and mouse multiplexor for the blade servers.

The illustrative embodiments provided herein describe a computer implemented method, a tangible computer medium, and a data processing system for waking a blade server from an operational state of reduced power. When server blade has enters the state of reduced power, a service firmware configures a multi-port blade switch of the server blade to direct incoming packets to the service firmware. The service firmware then polls for receipt of a Wake-on-Lan magic packet. When the Wake-on-Lan magic packet is received by the service firmware, the service firmware reconfigures the multi-port blade switch to direct incoming packets to an network interface card of the server blade. The service firmware then initiates a reboot of the server blade.

Figure 4:
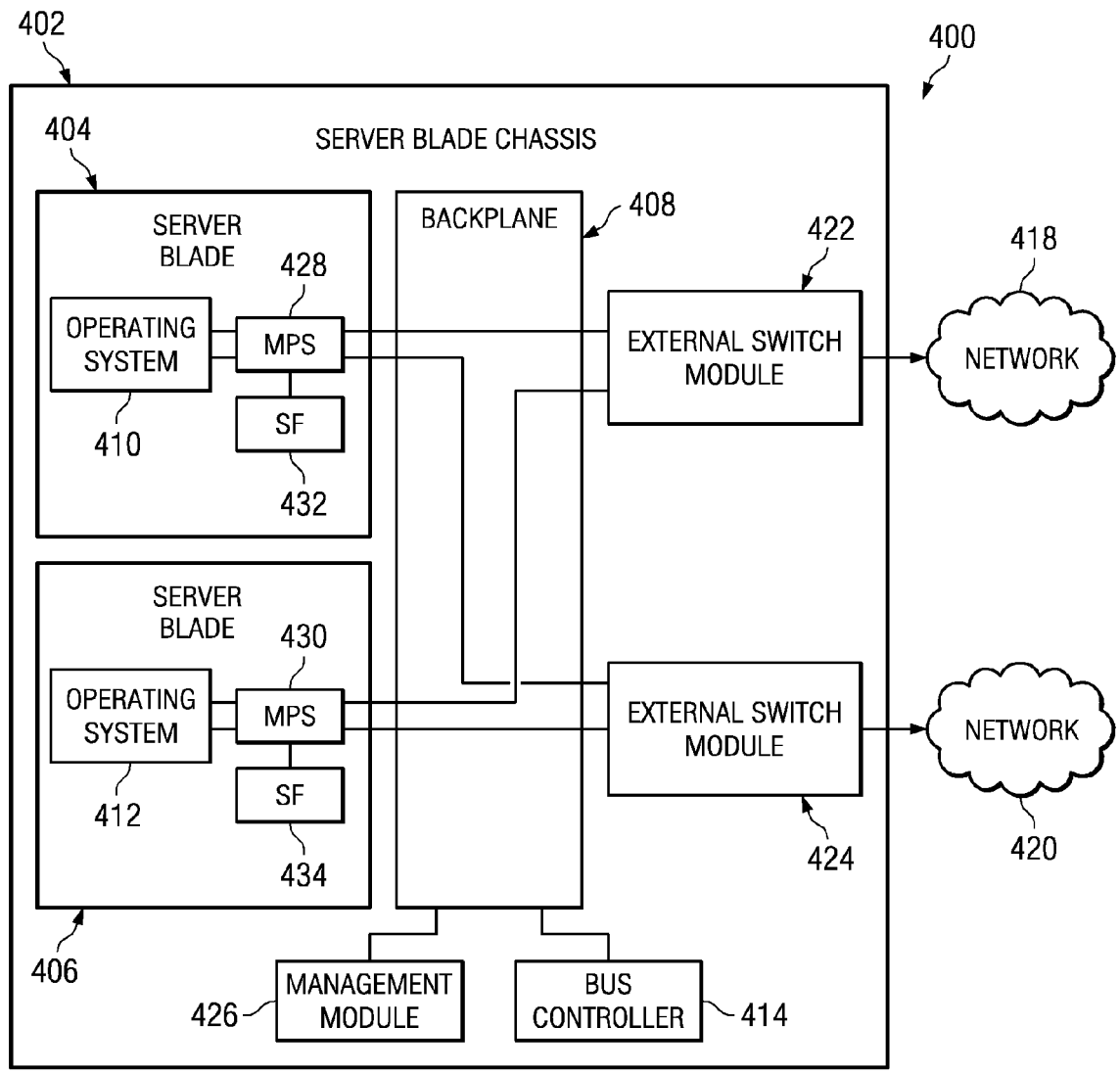
FIG. 4 is a blade server architecture shown according to an illustrative embodiment.

Referring now to FIG. 4, a blade server architecture is shown according to an illustrative embodiment. Blade server architecture 400 contains several server blades 404 and 406 which can be servers 104 or 106 of FIG. 1.

Server blade chassis 402 includes multiple hot-swappable server blades 404 and 406, which are connected to backplane 408. Server blades 404 and 406 include operating systems 410 and 412 which communicate through backplane 408 via an intermediate bus controller 414. Operating systems 410 and 412 may be implemented with any of a variety of commercially distributed general purpose microprocessors including PowerPC® processors available from IBM Corporation.

Server blades 404 and 406 can connect to outside networks 418 and 420 through external switch modules 422 and 424. External switch modules 422 and 424 are hot-swappable switches that connect all blade servers in server blade chassis 402 to one of outside networks 418 or 420, depending on the bay in which external switch modules 422 or 424 is installed in.

Server blade chassis 402 includes management module 426. Management module 426 is a hot-swappable hardware device plugged into server blade chassis 402. Management module 426 functions as a system-management service processor and keyboard, video, and mouse multiplexor for the blade servers.

Server blades 404 and 406 include embedded multi-port switches 428 and 430. Multi-port switches 428 and 430 are switches that provide external connectivity to other units within server blades 404 and 406, such as for example, service firmware 432 and 434, and operating systems 410 and 412.

Service firmware 432 and 434 are firmware components, such as a Hypervisor software available from International Business Machines, Corp, embedded onto server blades 404 and 406, or a software component stored within a local memory of server blades 404 and 406. Service firmware 432 and 434 provides diagnostics, initialization, configuration, run-time error detection, and correction for server blades 404 and 406.

Figure 5:
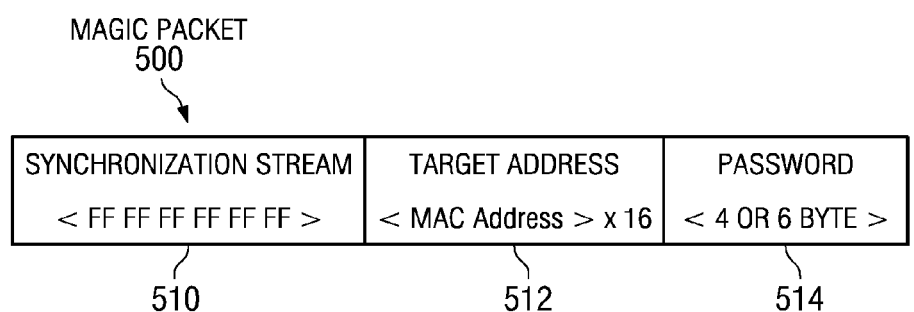
FIG. 5 is a formatted magic packet contents according to an illustrative embodiment.

Referring now to FIG. 5, a formatted magic packet contents are shown according to an illustrative embodiment. Magic packet 500 is a broadcast frame most commonly sent over a User Datagram Protocol. Magic packet 500 is a Wake-on-Lan packet, instructing a powered-down data processing system to be powered-up.

Anywhere within its payload, Magic packet 500 contains synchronization stream 510. Synchronization stream 510 is a hexadecimal payload 6 bytes of ones, rendered as FF FF FF FF FF FF, contained in magic packet 500. Synchronization stream 510 is an indication that a wake-on-lan instruction should be sent to the media access control address which follows Synchronization stream 510.

Immediately following Synchronization stream 510 within the payload of magic packet 500, magic packet contains target address 512. Target address 512 repeats a media access control address for a component that is to receive a wake-on-lan instruction.

Immediately following target address 512 within the payload of magic packet 500, Magic packet 500 optionally includes password 514. Password 514 is a 4 byte or 6 byte password that must match a password of the target component if the component is to be woken up.

Figure 6:
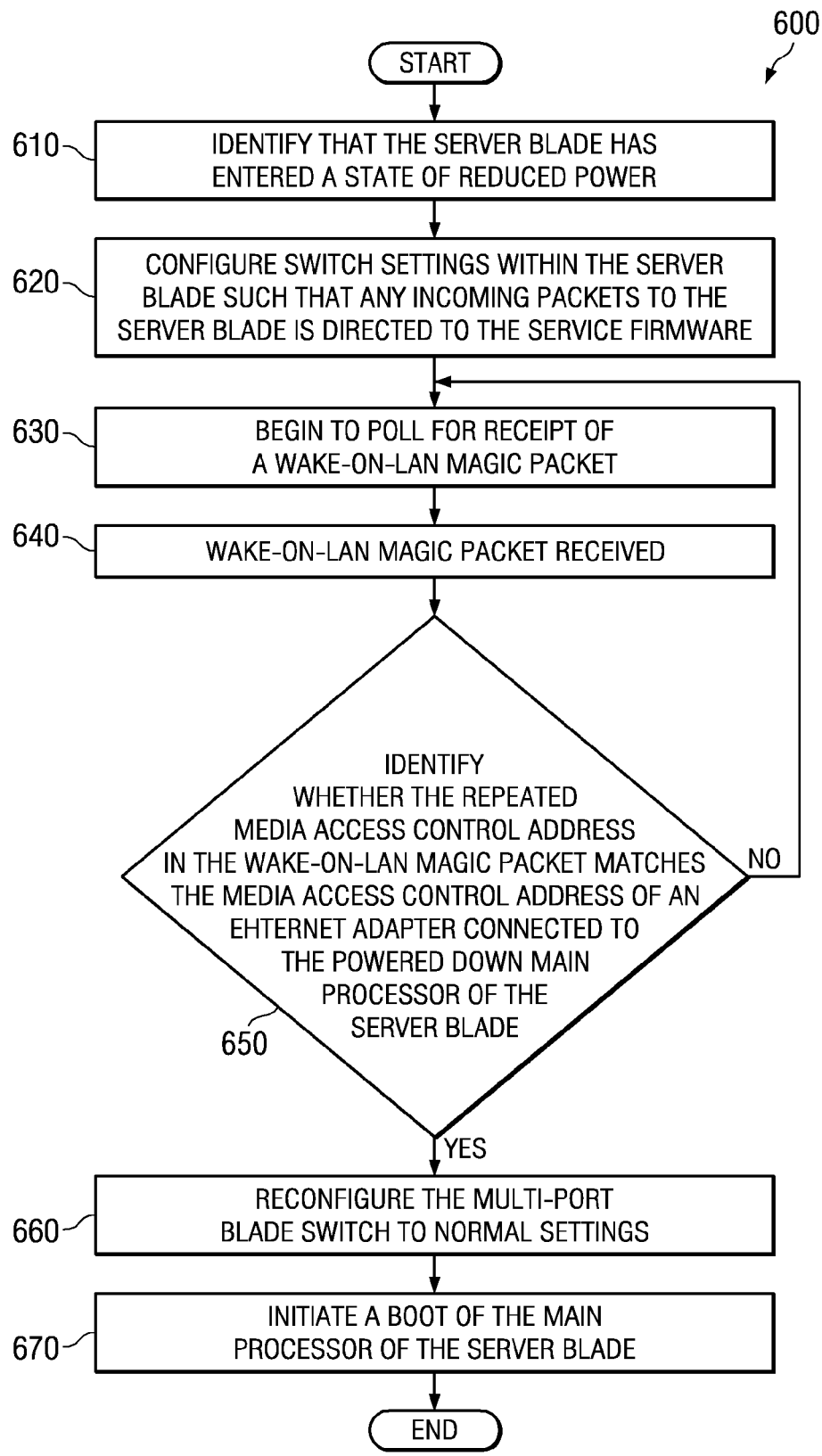
FIG. 6 is a flowchart of the processing steps for waking a blade server from an operational state of reduced power according to an illustrative embodiment.

Referring now to FIG. 6, a flowchart of the processing steps for waking a blade server from an operational state of reduced power is shown according to an illustrative embodiment. Process 600 is a firmware process, executing within a firmware component of a server blade, such as service firmware 432 and 434 of FIG. 4.

Process 600 begins by identifying that the server blade has entered a state of reduced power (step 610). The state of reduced power can be for example, but not limited to, a hibernation state of the server blade, a sleep-mode of the server blade, a shut down server blade, or other state in which the main processor is in a low-power state. When the blade is in standby mode, the main processor is inactive. However, the service firmware retains standby power and continues to function normally. The service firmware and the main processor utilize the multi-port blade switch, such as multi-port switches 428 and 430 of FIG. 4, to send communications external from the server blade.

Responsive to identifying that the server blade has entered a state of reduced power, process 600 configures switch settings within the server blade such that any incoming packets to the server blade is directed to the service firmware (step 620). By reconfiguring the switch settings, the service firmware is able to monitor for a Wake-on-Lan packet that would signal a wake up of the reduced power server blade. Thus, process 600 configures the service firmware to perform the Wake-on-Lan functions that have previously required a Peripheral Component Interconnect ethernet controller. Even in standby mode, the service firmware can configure the multi-port blade switch such that the service firmware receives any network packet targeted to a media access control address of a logical partition of the server blade.

Responsive to configuring switch settings within the server blade such that any incoming packets to the server blade is directed to the service firmware, process 600 begins to poll for receipt of a Wake-on-Lan magic packet (step 630). The Wake-on-Lan magic packet can be Wake-on-Lan magic packet 600 of FIG. 6. The magic packet is a broadcast frame containing anywhere within its payload 6 bytes of ones, resulting in hexadecimal FF FF FF FF FF FF, followed by sixteen repetitions of the target media access control address. The Magic Packet may be sent as a broadcast packet of any network-layer and transport-layer protocol.

When a Wake-on-Lan magic packet is received (step 640), process 600 then identifies whether the repeated media access control address in the Wake-on-Lan magic packet matches the media access control address of an network interface card connected to the powered down main processor of the server blade (step 650). When the Wake-on-Lan magic packet is received at the service firmware, the service firmware will check media access control addresses for any network interface card and logical partition within the server blade. If the repeated media access control address in the Wake-on-Lan magic packet is identical to a media access control addresses for an network interface card of a logical partition within the server blade, then a match has occurred.

Responsive to identifying that the repeated media access control address in the Wake-on-Lan magic packet does not match the media access control address of an network interface card connected to the powered down main processor of the server blade ("no" at step 650), process 600 returns to step 630. Process 600 then continues to poll for receipt of a subsequent Wake-on-Lan magic packet (step 630).

Returning now to step 650, responsive to identifying that the repeated media access control address in the Wake-on-Lan magic packet matches the media access control address of an network interface card connected to the powered down main processor of the server blade ("yes" at step 650), process 600 reconfigures the multi-port blade switch to normal settings (step 660). Incoming network packets received at the server blade are now routed to their respective network interface card of the logical partitions, and not to the service firmware.

Responsive to reconfiguring the multi-port blade switch to normal settings, process 600 initiates a boot of the main processor of the server blade (step 670), with the process terminating thereafter.

Thus, the illustrative embodiments described herein provide a computer implemented method, a tangible computer medium, and a data processing for waking a blade server from an operational state of reduced power. When server blade has entered the state of reduced power, a service firmware configures a multi-port blade switch of the server blade to direct incoming packets to the service firmware. The service firmware then polls for receipt of a Wake-on-Lan magic packet.

When the Wake-on-Lan magic packet is received by the service firmware, the service firmware reconfigures the multi-port blade switch to direct incoming packets to a network interface card of the server blade. The service firmware then initiates a reboot of the server blade.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact-diskread only memory (CD-ROM), compact diskread/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for waking a blade server from an operational state of reduced power comprising the computer implemented steps of:
    identifying that a server blade has entered a state of reduced power;
    responsive to identifying that the server blade has entered the state of reduced power, configuring a multi-port blade switch of the server blade to direct incoming packets to a service firmware;
    responsive to configuring a multi-port blade switch of the server blade to direct incoming packets to the service firmware, polling for receipt of a packet, wherein the packet contains a hexadecimal payload of 6 bytes of ones; and
    responsive to receiving the packet, reconfiguring the multi-port blade switch to direct incoming packets to a network interface card of the server blade.

2. The computer implemented method of claim 1 further comprising:
    responsive to receiving the packet, identifying whether a media access control address in the packet matches the media access control address of the network interface card of the server blade.

3. The computer implemented method of claim 2, wherein the step of reconfiguring the multi-port blade switch to direct incoming packets to the network interface card of the server blade further comprises:
    responsive to receiving the packet and responsive to identifying that the media access control address in the packet matches the media access control address of the network interface card of the server blade, reconfiguring the multi-port blade switch to direct incoming packets to the network interface card of the server blade.

4. The computer implemented method of claim 3, wherein the step of reconfiguring the multi-port blade switch to direct incoming packets to the network interface card of the server blade further comprises:
    responsive to receiving the packet and responsive to identifying that the media access control address in packet matches the media access control address of the network interface card of the server blade, reconfiguring the multi-port blade switch to direct incoming packets to a particular port of the multi-port blade switch.

5. The computer implemented method of claim 1, wherein the step of identifying that a server blade has entered a state of reduced power further comprises:
    identifying that the server blade has entered the state of reduced power, wherein the state of reduced power is selected from the group consisting of a hibernation state of a main processor of the server blade, a sleep-mode of the main processor of the server blade, and a shut down of the main processor of the server blade.

6. The computer implemented method of claim 1, wherein the step of responsive to identifying that the server blade has entered the state of reduced power, configuring a multi-port blade switch of the server blade to direct incoming packets to the service firmware further comprises:
    responsive to identifying that the server blade has entered the state of reduced power, configuring a multi-port blade switch of the server blade to direct incoming packets to the service firmware, wherein the multi-port blade switch is configured by the service firmware.

7. The computer implemented method of claim 1, further comprising:
    maintaining standby power to the service firmware so that the service firmware continues to function.

8. A tangible computer readable storage medium having a computer program product encoded thereon for waking a blade server from an operational state of reduced power, the computer readable medium comprising:
    computer usable instructions for identifying that a server blade has entered a state of reduced power;
    computer usable instructions, responsive to identifying that the server blade has entered the state of reduced power, for configuring a multi-port blade switch of the server blade to direct incoming packets to a service firmware;
    computer usable instructions, responsive to configuring a multi-port blade switch of the server blade to direct incoming packets to the service firmware, for polling for receipt of a packet, wherein the packet contains a hexadecimal payload of 6 bytes of ones; and
    computer usable instructions, responsive to receiving the packet, for reconfiguring the multi-port blade switch to direct incoming packets to a network interface card of the server blade.

9. The tangible computer readable medium of claim 8 further comprising:
    computer usable instructions, responsive to receiving the packet, for identifying whether a media access control address in the packet matches the media access control address of the network interface card of the server blade.

10. The tangible computer readable medium of claim 9, wherein the computer usable instructions for reconfiguring the multi-port blade switch to direct incoming packets to the network interface card of the server blade further comprises:
  computer usable instructions, responsive to receiving the packet and responsive to identifying that the media access control address in the packet matches the media access control address of the network interface card of the server blade, for reconfiguring the multi-port blade switch to direct incoming packets to the network interface card of the server blade.

11. The tangible computer readable medium of claim 10, wherein the computer usable instructions for reconfiguring the multi-port blade switch to direct incoming packets to the network interface card of the server blade further comprises:
  computer usable instructions, responsive to receiving the packet and responsive to identifying that the media access control address in the packet matches the media access control address of the network interface card of the server blade, reconfiguring the multi-port blade switch to direct incoming packets to a particular port of the multi-port blade switch.

12. The tangible computer readable medium of claim 8, wherein the computer usable instructions for identifying that a server blade has entered a state of reduced power further comprises:
  computer usable instructions for identifying that the server blade has entered the state of reduced power, wherein the state of reduced power is selected from the group consisting of a hibernation state of a main processor of the server blade, a sleep-mode of the main processor of the server blade, and a shut down of the main processor of the server blade.

13. The tangible computer readable medium of claim 8, wherein the computer usable instructions for configuring a multi-port blade switch of the server blade to direct incoming packets to the service firmware further comprises:
  computer usable instructions, responsive to identifying that the server blade has entered the state of reduced power, for configuring a multi-port blade switch of the server blade to direct incoming packets to the service firmware, wherein the multi-port blade switch is configured by the service firmware.

14. The tangible computer readable medium of claim 8, further comprising:
  computer usable instructions for maintaining standby power to the service firmware so that the service firmware continues to function.

15. A data processing system comprising:
  a bus;
  a communications unit connected to the bus;
  a memory connected to the bus, wherein the memory includes a computer usable code for waking a blade server from an operational state of reduced power; and
  a processor unit connected to the bus, wherein the processor unit executes the computer usable code to identify that a server blade has entered a state of reduced power; responsive to identifying that the server blade has entered the state of reduced power, to configure a multi-port blade switch of the server blade to direct incoming packets to a service firmware; responsive to configuring a multi-port blade switch of the server blade to direct incoming packets to a service firmware, to poll for receipt of a packet, wherein the packet contains a hexadecimal payload of 6 bytes of ones; and responsive to receiving the packet, reconfigure the multi-port blade switch to direct incoming packets to an network interface card of the server blade.

16. The data processing system of claim 15 wherein the processor unit further executes the computer usable code, responsive to receiving the packet, to identify whether a media access control address in the packet matches the media access control address of the network interface card of the server blade.

17. The data processing system of claim 15, wherein the processor unit executing the computer usable code to reconfigure the multi-port blade switch to direct incoming packets to the network interface card of the server blade further comprises:
  the processor unit executing the computer usable code, responsive to receiving the packet and responsive to identifying that the media access control address in the packet matches the media access control address of the network interface card of the server blade, to reconfigure the multi-port blade switch to direct incoming packets to the network interface card of the server blade.

18. The data processing system of claim 17, wherein the processor unit executing the computer usable code to reconfigure the multi-port blade switch to direct incoming packets to the network interface card of the server blade further comprises:
  the processor unit executing the computer usable code, responsive to receiving the packet and responsive to identifying that the media access control address in the packet matches the media access control address of the network interface card of the server blade, to reconfigure the multi-port blade switch to direct incoming packets to a particular port of the multi-port blade switch.

19. The data processing system of claim 15, wherein the processor unit executing the computer usable code to identify that a server blade has entered a state of reduced power further comprises:
  the processor unit executing the computer usable code to identify that the server blade has entered the state of reduced power, wherein the state of reduced power is selected from the group consisting of a hibernation state of a main processor of the server blade, a sleep-mode of the main processor of the server blade, and a shut down of the main processor of the server blade.

20. The data processing system of claim 15, wherein the processor unit executing the computer usable code to configure a multi-port blade switch of the server blade to direct incoming packets to the service firmware further comprises:
  the processor unit executing the computer usable code, responsive to identifying that the server blade has entered the state of reduced power, to configure a multi-port blade switch of the server blade to direct incoming packets to the service firmware, wherein the multi-port blade switch is configured by the service firmware.

* * * * *